United States Patent [19]

Tojo et al.

[11] Patent Number: 4,578,607
[45] Date of Patent: Mar. 25, 1986

[54] PIEZOELECTRIC PRECISE ROTATION MECHANISM FOR SLIGHTLY ROTATING AN OBJECT

[75] Inventors: Toru Tojo, Ninomiya; Kazuyoshi Sugihara, Kawasaki, both of Japan

[73] Assignee: Kabushiki Kaisha Toshiba, Kawasaki, Japan

[21] Appl. No.: 664,964

[22] Filed: Oct. 26, 1984

[30] Foreign Application Priority Data

Nov. 30, 1983 [JP] Japan ............................... 58-225701

[51] Int. Cl.$^4$ ............................................. H01L 41/08
[52] U.S. Cl. ..................................... 310/328; 310/317
[58] Field of Search ......................... 310/323, 328, 317

[56] References Cited

U.S. PATENT DOCUMENTS

| 3,377,489 | 4/1968 | Brisbane | 310/328 |
| 3,952,215 | 4/1972 | Sakitani | 310/328 |
| 4,163,168 | 7/1979 | Ishikawa et al. | 310/328 |
| 4,219,755 | 8/1980 | O'Neill | 310/328 |
| 4,422,002 | 12/1983 | Binnig et al. | 310/328 |
| 4,455,501 | 6/1984 | Tojo et al. | 310/328 |
| 4,468,583 | 8/1984 | Mori | 310/328 |

FOREIGN PATENT DOCUMENTS 0085745 8/1983 European Pat. Off. .
1933205 1/1971 Fed. Rep. of Germany .
2522216 2/1983 France .
5112497 4/1967 Japan .
58-139681 8/1983 Japan .
58-190080 11/1983 Japan .

Primary Examiner—Mark O. Budd
Attorney, Agent, or Firm—Oblon, Fisher, Spivak, McClelland & Maier

[57] ABSTRACT

In a precise rotation mechanism for slightly rotating an object, a drive disk is placed on a flat and smooth surface of a base and rotating disk is mounted on the disk surface of the drive disk and rotatably supported by a pivot bearing on a coupling section of the drive disk. Fixed sections of the drive disk are fixed on the base and movable sections of the drive disk are tiltably coupled to the fixed sections through the coupling section by elastic hinges and also coupled to the fixed sections by driving members made of piezoelectric elements, which are elongated/contracted upon application of a voltage to slightly move the movable sections. Fixing members made of the piezoelectric elements are respectively fixed to the movable sections. When one of the fixing members is contracted, the rotating disk is urged by one of the fixing members against the movable sections and is movable together with the movable sections.

10 Claims, 13 Drawing Figures

F I G. 1
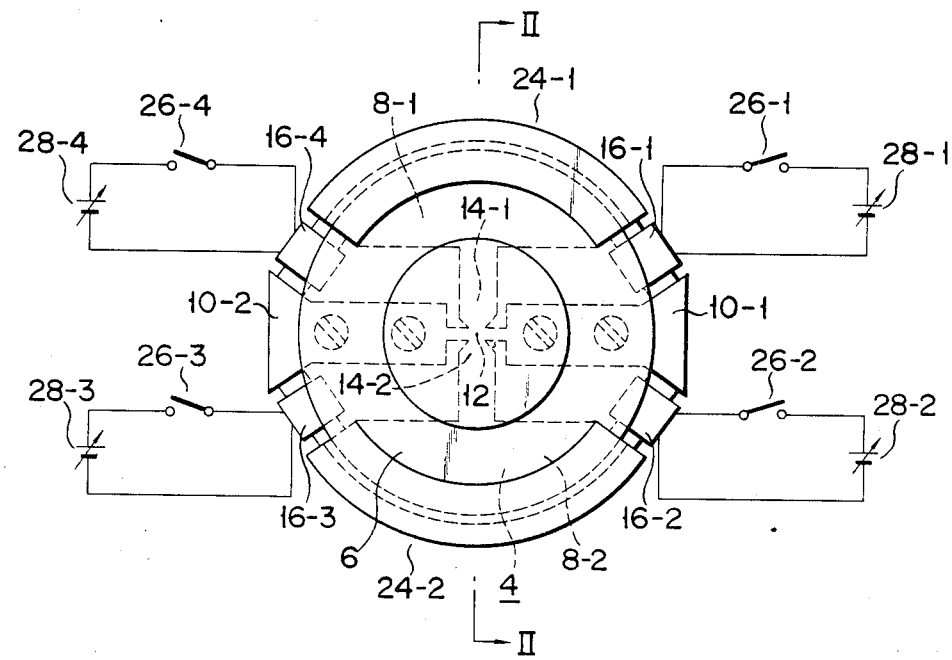
F I G. 2
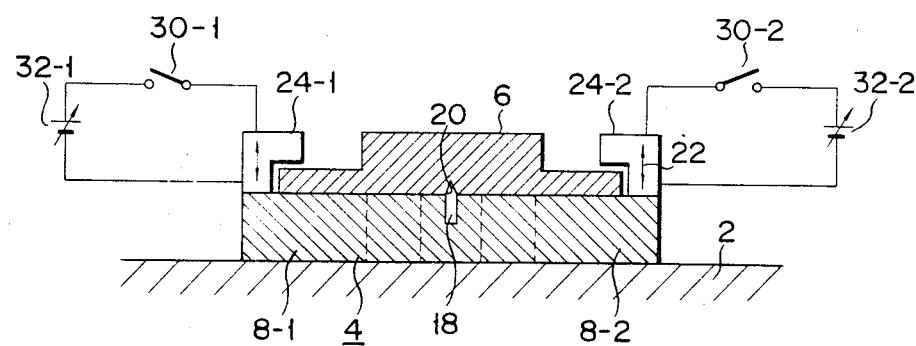

PIEZOELECTRIC PRECISE ROTATION MECHANISM FOR SLIGHTLY ROTATING AN OBJECT

BACKGROUND OF THE INVENTION

This invention relates to a fine or precise rotation mechanism for rotating, with high precision, an object to a desired position.

Recently, an electron beam drawing system, a reduction projection type transfer system and an X-ray lithography system have been developed as systems for forming a fine pattern on an object such as a semiconductor wafer and a mask substrate. This type of apparatus requires a driving mechanism for slightly and precisely moving a sample on the order of submicrons. High precision, fine driving mechanisms are required not only for the systems mentioned above, but also in technical fields where precise measurements are required.

Fine driving mechanisms include those in which an object is moved linearly in one direction and those in which an object is rotated. The prior art fine rotation mechanisms for causing a rotating motion have the following problems. With a driving mechanism where the rotating stroke is large, it is difficult to obtain slight motion. On the other hand, with a driving mechanism where slight motion is possible, it is impossible to provide a large rotating stroke.

A fine rotation mechanism which solves the above problem was proposed by the inventor of the present application in U.S. Pat. No. 4,455,501 issued on June 19, 1984. However, even in this fine rotation mechanism, the following problem is presented. Rotational driving members, i.e., piezoelectric elements which can be elongated and contracted according to the voltage applied to them, are arranged on a rotating table, and high voltage lines are connected to the rotational driving members to drive them. In principle, in this fine rotation mechanism, the rotating table can be rotated at any speed. However, every time the rotating table revolves, the lines are twisted, and the rotating table can be rotated only by a predetermined number of revolutions. In addition to this disadvantage, the lines are brought into slidable contact with fixed members to be damaged thereby, resulting in incomplete electric insulation.

SUMMARY OF THE INVENTION

It is an object of the present invention to provide a precise rotation mechanism for slightly and precisely rotating an object to a desired position, wherein very slight motion can be obtained, and a rotating stroke can be large.

In order to achieve the above object of the present invention, there is provided a precise rotation mechanism comprising: a base member; a rotatable member; means for rotatably supporting said rotatable member; first and second driving members capable of elongation and contraction; first and second supporting members fixed on said base member, for supporting said first and second driving members fixed thereon; first and second movable sections driving on said first and second fixed members and moved by contraction and elongation of said first and second driving members, respectively; first and second fixing members for fixing said first and second movable sections to said first and second rotatable members respectively; and energizing means for energizing said first and second driving members and said first and second fixing members to rate the rotatable member. In an embodiment of the invention, in a first step, said first fixing member is energized to fix said first movable section to said rotatable member, and said first driving member is energized to cause said first driving member to elongate or contract so as to slightly rotate said rotatable member together with said first movable section. In a second step, said second fixing member is energized to fix said second movable section to said rotatable member, and said first fixing member is deenergized to release said first movable section from said rotatable member. In a third step, which said second fixing member is energized to fix said second movable section to said rotatable member, said second driving member is energized to cause said second driving member to elongate or contract so as to slightly rotate said rotatable member together with said second movable section. These steps are repeated according to a predetermined rotating amount.

BRIEF DESCRIPTION OF THE DRAWINGS

FIG. 1 is a plan view of a precise rotation mechanism for slightly rotating, with high precision, an object to a desired position according to an embodiment of the present invention;

FIG. 2 is a sectional view taken along the line II—II of FIG. 1;

DETAILED DESCRIPTION OF THE PREFERRED EMBODIMENTS

Figure 3:
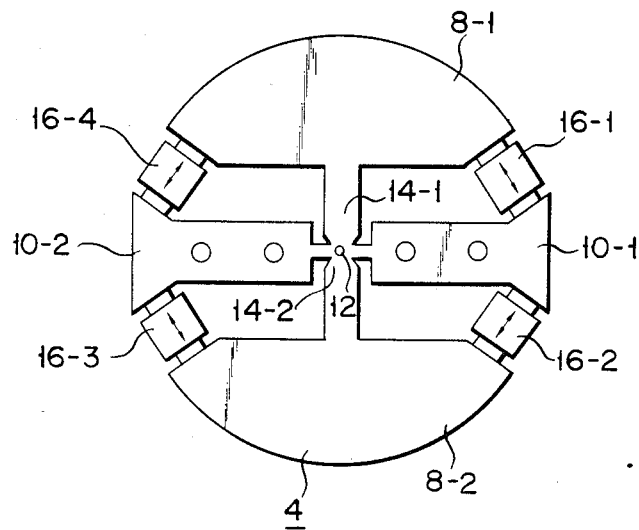
FIG. 3 is a plan view of a drive disk shown in FIGS. 1 and 2.
Figure 4:
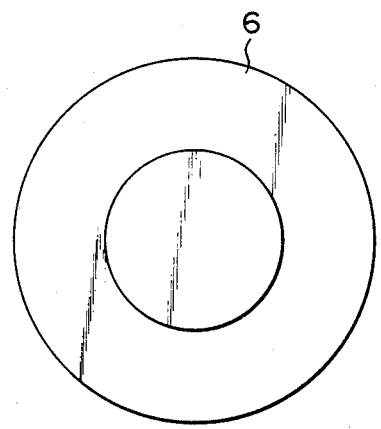
FIG 4 is a plan view of a rotating disk shown in FIGS. 1 and 2.

A precise rotation mechanism, which slightly rotates, with high precision, an object to a desired position according to an embodiment of the present invention, will be described with reference to FIGS. 1 and 2. A drive disk 4 shown in FIG. 3 is placed on a flat and smooth surface of a base 2, and a rotating disk 6 shown in FIG. 4 is rotatably mounted on the disk surface of the drive disk 4. The drive disk 4 comprises movable sections 8-1 and 8-2 and fixed sections 10-1 and 10-2, coupled by a coupling section 12 located at the center of the drive disk 4 as shown in FIG. 3. The fixed sections 10-1 and 10-2 are fixed on the base 2 with bolts or the like. The movable sections 8-1 and 8-2 are coupled to the coupling section 12 of the drive disk 4 through elastic hinges 14-1 and 14-2 so as to swing on the base 2 about the center of the drive disk 4. The movable sections 8-1 and 8-2 are coupled to the fixed sections 10-1 and 10-2 by driving members 16-1, 16-2, 16-3 and 16-4 made of piezoelectric elements, which are elongated/contracted upon application of a voltage to slightly move the movable sections 8-1 and 8-2. The driving members 16-1, 16-2, 16-3 and 16-4 are supported by an adhesive or screws in spaces between the moving sections and the fixed sections.

The rotating disk 6 mounted on the drive disk 4 is rotatably supported by a pivot bearing. This pivot bearing is obtained such that a pivot 18 fixed on the coupling section 12 is rotatably inserted in a recess 20 formed at the center of the lower surface of the rotating disk 6.

Figure 5:
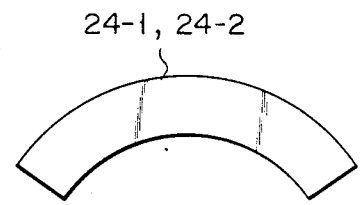
FIG. 5 is a plan view of a fixing member shown in FIGS. 1 and 2.

Fixing members 24-1 and 24-2 are arranged around the movable sections 8-1 and 8-2 and are made of the piezoelectric elements subjected to elongation and contraction along the axial direction (indicated by arrow 22) of the mechanism upon application of a voltage, as shown in FIG. 5. The fixing members 24-1 and 24-2 are respectively fixed to the movable sections 8-1 and 8-2. When one of the fixing members 24-1 and 24-2 is contracted, the rotating disk 6 is urged by one of the fixing members 24-1 and 24-2 against the movable sections 8-1 and 8-2 and is movable together with the movable sections 8-1 and 8-2. The driving members 16-1, 16-2, 16-3 and 16-4 are connected to power sources 28-1, 28-1, 28-3 and 28-4 through switching elements 26-1, 26-2, 26-3 and 26-4, respectively. Similarly, the fixing members 24-1 and 24-2 are connected to power sources 32-1 and 32-2 through switching elements 30-1 and 30-2, respectively.

The precise rotating mechanism shown in FIGS. 1 and 2 is operated in the following manner.

Figure 6A:
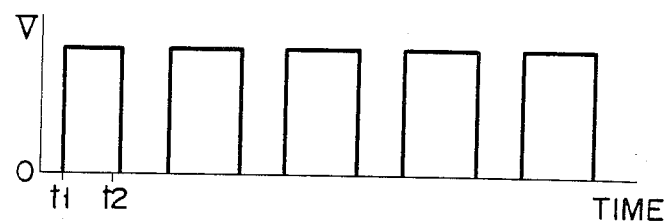
FIGS. 6A to 6F show timing charts of voltages applied to driving elements and fixing elements shown in FIGS. 1 and 2.
Figure 6B:
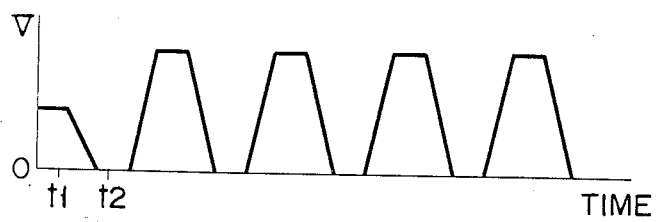
Figure 6C:
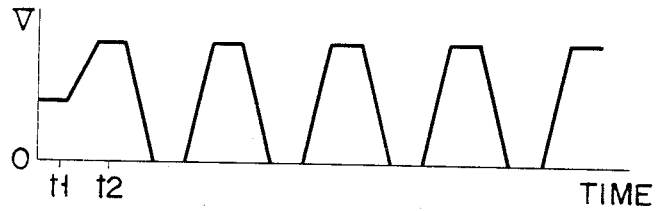
Figure 6D:
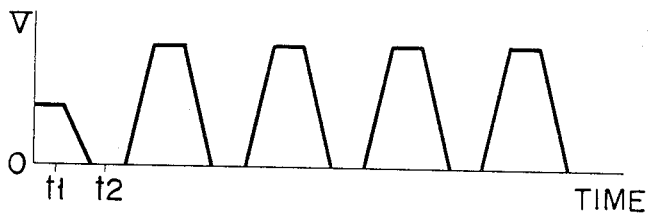
Figure 6E:
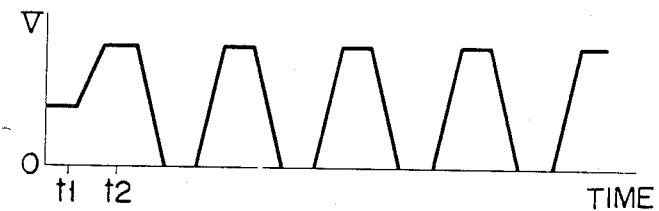

The switching element 30-1 is closed at time t1, and a voltage is applied to the fixing member 24-1, as shown in FIG. 6A. The fixing member 24-1 is contracted to fix the rotating disk 6 to the movable section 8-1. Thereafter, as shown in FIG. 6B, to the voltage applied to the driving member 16-1 is gradually decreased. As a result, the driving member 16-1 is elongated. Substantially at the same time, as shown in FIG. 6C, a voltage applied to the driving member 16-4 is gradually increased, so that the driving member 16-4 is contracted. Therefore, the movable section 8-1 and the rotating disk 6 fixed thereto are slightly rotated counterclockwise in accordance with elongation and contraction of the driving members 16-1 and 16-4. While the driving members 16-1 and 16-4 are elongated and contracted, respectively, a voltage applied to the driving member 16-2 through the switching element 26-2 is gradually decreased, as shown in FIG. 6D, so that the driving member 16-2 is elongated. At the same time, as shown in FIG. 6E, a voltage applied to the driving member 16-3 through the switching element 26-3 is gradually increased to contract the driving member 16-3. Therefore, the movable section 8-2 is slightly rotated clockwise opposite to the rotational direction of the movable section 8-1 upon elongation and contraction of the driving members 16-4 and 16-2. As is apparent from the above description, the fixing member 24-2 will not be contracted but is kept elongated so as to guarantee rotation of the rotating disk 6.

Figure 6F:
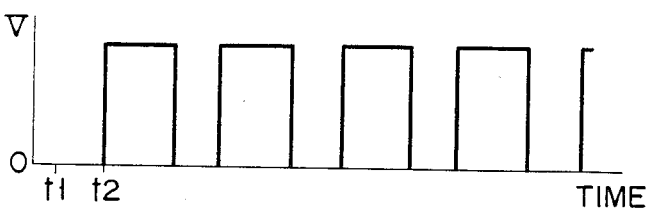

The switching element 30-2 is closed at time t2, and a voltage is applied to the fixing member 24-2, as shown in FIG. 6F. The fixing member 24-2 is contracted, and the rotating disk 6 is fixed to the movable section 8-2. Thereafter, the switching element 30-1 is opened to deenergize the fixing member 24-1, so that the fixing member 24-1 is elongated, and the rotating disk 6 is released from the movable section 8-1. In this condition, a voltage applied to the driving member 16-2 is gradually increased, as shown in FIG. 6D. As a result, the driving member 16-2 is contracted. At the same time, as shown in FIG. 6E, a voltage applied to the driving member 16-3 is gradually decreased, thereby elongating the driving member 16-3. Therefore, the movable section 8-2 and the rotating disk 6 fixed thereto are slightly rotated counterclockwise upon contraction and elongation of the driving members 16-2 and 16-4. The voltage applied to the driving member 16-4 through the switching element 26-4 is gradually decreased, as shown in FIG. 6C, so that the driving member 16-4 is elongated. At the same time, as shown in FIG. 6B, the voltage applied to the driving member 16-1 through the switching element 26-1 is gradually increased, thereby contracting the driving member 16-1. Therefore, the movable section 8-1 is slightly rotated counterclockwise opposite to the rotational direction of the movable section 8-1 upon elongation and contraction of the driving members 16-1 and 16-4.

By repeating the above operation, the rotating disk 6 continues to slightly rotate around the pivot bearing due to the movement of the movable sections 8-1 and 8-2. As is apparent from the above operation, the rotating disk 6 can be rotated clockwise upon application of voltages to the driving members 16-1, 16-2, 16-3 and 16-4 in such a manner that they can alternate between elongation and contraction.

In the above embodiment, the rotating disk 6 can rotate as many times as possible without being interfered with by cords or the like and can also be slightly rotated. In addition, the level of the voltage applied to the driving member can be adjusted to perform coarse and fine rotation of the rotating disk. The cycle of contraction and elongation of the driving member can be shortened to vibrate movable sections 8-1 and 8-2 at a relatively high speed, thereby rotating the rotating disk at high speed.

Figure 7:
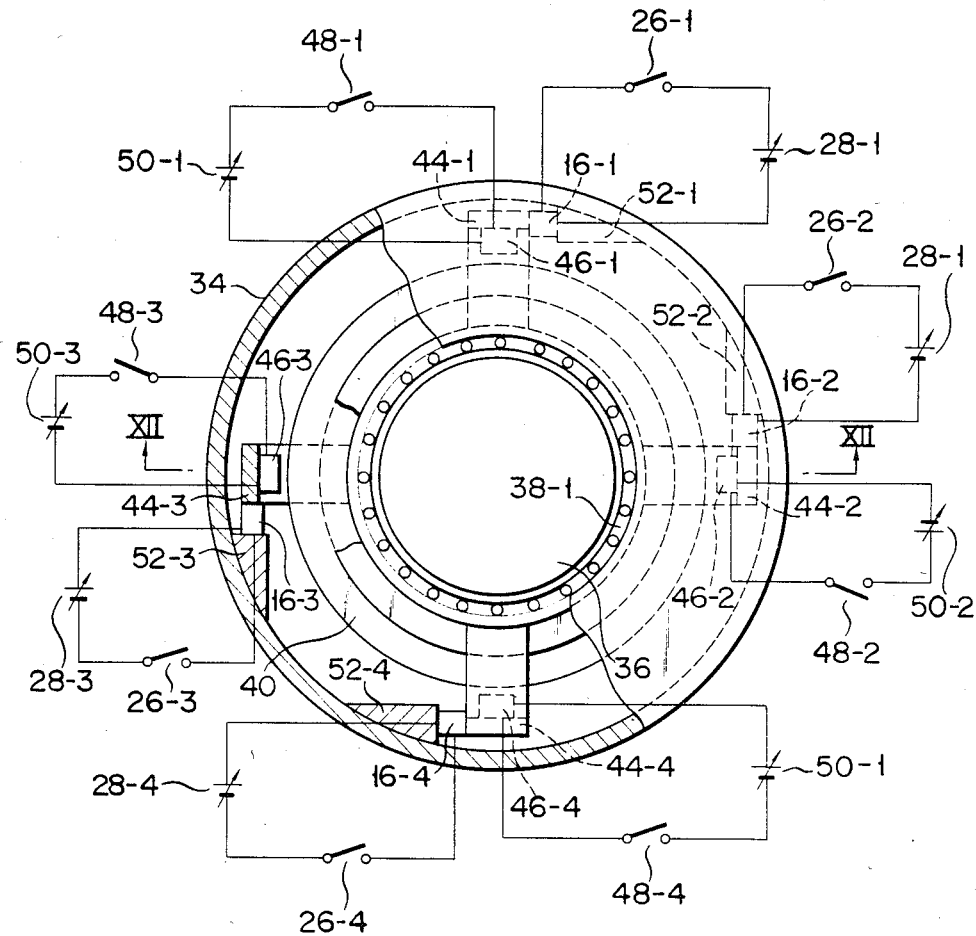
FIG. 7 is a plan view of a precise rotation mechanism for slightly rotating, with high precision, an object to a desired position according to another embodiment of the present invention.
Figure 8:
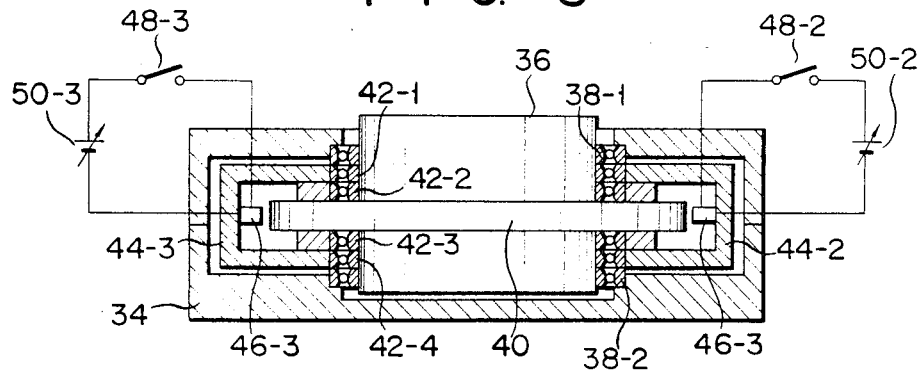
FIG. 8 is a sectional view taken along the line XII—XII of FIG. 6.

Another embodiment of the present invention will be described with reference to FIGS. 7 and 8. In the precise rotation mechanism shown in FIGS. 7 and 8, bearings 38-1 and 38-2 comprising ball bearings are fixed in a hollow cylindrical housing 34. A rotating cylinder 36 having a rotating disk 40 adapted to receive the driving force is rotatably supported by the bearings 38-1 and 38-2. Bearings 42-1, 42-2, 42-3 and 42-4 comprising ball bearings are fixed to the rotating cylinder 36. Movable sections 44-1, 44-2, 44-3 and 44-4 symmetrical about the axis of the rotating cylinder 36 are mounted on the bearings 42-1, 42-2, 42-3 and 42-4, respectively, and can be supported by the rotating cylinder 36 to be slightly rotated around the rotating cylinder 36. Fixing members 46-1, 46-2, 46-3 and 46-4 made of piezoelectric elements, which are elongated and contracted upon application of voltages thereto, are arranged in the movable sections 44-1, 44-2, 44-3 and 44-4, respectively. The fixing members 46-1, 46-2, 46-3 and 46-4 are connected to power sources 50-1, 50-2, 50-3 and 50-4 through switching elements 48-1, 48-2, 48-3 and 48-4, respectively. Fixing sections 52-1, 52-2, 52-3 and 52-4 corresponding to the movable sections 44-1, 44-2, 44-3 and 44-4 are formed on the inner surface of the hollow cylindrical housing 34. The fixing sections 52-1, 52-2, 52-3 and 52-4 are coupled to the movable sections 44-1, 44-2, 44-3 and 44-4 through driving members 16-1, 16-2, 16-3 and 16-4 made of piezoelectric elements, which are contracted and elongated upon application voltages thereto, respectively.

According to the precise rotation mechanism shown in FIGS. 7 and 8, the rotating cylinder 34 is rotated in the following manner. Switching elements 48-1 and 48-2 are opened to elongate the fixing members 46-1 and 46-2, so that the movable sections 44-1 and 44-4 are coupled to the rotating disk 40 by the fixing members 46-1 and 46-4. Subsequently, the driving members 16-1 and 16-4 are elongated to slightly rotate the rotating disk 40 together with the movable sections 44-1 and 44-4. As a result, the rotating cylinder 36 is slightly rotated in a counterclockwise direction. After the rotating cylinder 36 is slightly rotated, the switching elements 48-2 and 48-3 are opened to elongate the fixing members 46-2 and 46-3, so that the movable sections 44-2 and 44-3 are coupled to the rotating disk 40 by the fixing members 46-2 and 46-3. The switching elements 48-1 and 48-4 are closed to contract the fixing members 46-1 and 46-4, so that the movable sections 44-1 and 44-4 are released from the rotating disk 40. The driving members 16-1 and 16-4 are contracted, and at the same time, the driving members 16-2 and 16-3 are contracted while the movable sections 44-2 and 44-3 are coupled to the rotating disk 40, so that the rotating disk 40 is slightly rotated together with the movable sections 44-2 and 44-3. As a result, the rotating cylinder 36 is slightly rotated in the counterclockwise direction.

By repeating the above operation, the rotating cylinder 36 continues to slightly rotate upon movement of the movable sections. In the same manner as the embodiment described in FIGS. 1 and 2, the rotating cylinder can be rotated clockwise by applying the voltages to the driving members 16-1, 16-2, 16-3 and 16-4 in such a manner elongation and contraction are alternated.

In the above embodiment, the rotating cylinder 36 can rotate as many times as possible without being interfered with by cords or the like and can be slightly rotated. In addition, the level of the voltage applied to the driving member can be adjusted to perform coarse and fine rotation of the rotating disk. The cycle of contraction and elongation of the driving member can be shortened to vibrate movable sections at a relatively high speed, thereby rotating the rotating disk at high speed.

The present invention is not limited to the particular embodiments described above. Various changes and modifications may be made within the spirit and scope of the invention. For example, an electrostatic chuck may be used in place of the fixing members. The centering means is not limited to the pivot bearing or ball bearing, but may be extended to a roller bearing, an air bearing or any other bearing. Furthermore, at least two driving members need to be used to move the movable section, so that the number of driving members is not limited.

What is claimed is:

1. A precise rotation mechanism comprising:
a base member;
first and second movable sections;
a first fixed section arranged between the first and second movable sections and fixed to the base member;
first and second driving members capable of elongation and contraction, said first and second movable sections being coupled to said first fixed section through said first and second driving members, respectively;
a rotatable member having a rotation center and a surface facing the first and second movable sections;
means for defining an axis of rotation of said rotatable member;
first and second energizable fixing members being movable upon energization thereof for fixing said rotatable member to said first and second movable sections; and
energizing means for energizing said first and second fixing members and said first and second driving members, to rotate said rotatable member.

2. A mechanism according to claim 1, further comprising first and second hinges for coupling the first and second movable sections to the first fixed section.

3. A mechanism according to claim 1, wherein the rotatable member has a disk-like shape.

4. A mechanism according to claim 1, further comprising a second fixed section arranged between the first and second movable sections and coupled to the first fixed section.

5. A mechanism according to claim 1, wherein said fixing members are movable upon energization thereof in a direction parallel to said axis of rotation.

6. A mechanism according to claim 1, wherein in a first step, said first fixing member being energized to fix said first movable section to said rotatable member and said first driving member being energized to cause said first driving member to elongate or contract so as to slightly rotate said rotatable member together with said first movable section, in a second step, said second fixing member being energized to fix said second movable section to said rotatable member and said first fixing member being deenergized to release said first movable section from said rotatable member, and in a third step, said second fixing member being energized to fix said second movable section to said rotatable member and said second driving member being energized to cause said second driving member to elongate or contract so as to slightly rotate said rotatable member together with said second movable section.

7. A mechanism according to claim 1, wherein said means for defining an axis of rotation comprises a pivot bearing.

8. A mechanism according to claim 1, wherein said means for defining an axis of rotation comprises a ball bearing.

9. A mechanism according to claim 4, further comprising third and fourth driving members capable of elongation and, the first and second movable sections being coupled to the second fixed section through the third and fourth driving members, respectively, wherein said energizing means energizes said first, second, third and fourth driving members and said first and second fixing members in such a manner that, in a first step, said first fixing member is energized to fix said first movable section to said rotatable member, and said first and third driving members are energized to cause said first driving member to elongate and said third driving member to contract so as to slightly rotate said rotatable member together with said first movable section, in a second step, said second fixing member is energized to fix said second movable section to said rotatable member, and said first fixing member is deenergized so as to release said first movable section from said rotatable member, and in a third step, said second fixing member is energized to fix said second movable section, and said second and fourth driving members are energized to cause said second driving member to elongate and said fourth driving member to contract so as to slightly rotate said rotatable member together with said second movable section.

10. A mechanism according to claim 9, wherein each of said driving members is piezoelectric element.

* * * * *